United States Patent
Lee et al.

(10) Patent No.: US 11,781,707 B2
(45) Date of Patent: Oct. 10, 2023

(54) SUPPORTING DEVICE

(71) Applicant: SYNCMOLD ENTERPRISE CORP., New Taipei (TW)

(72) Inventors: Yi-Xin Lee, New Taipei (TW); Chuan-Min Chung, New Taipei (TW); Wen-Chen Liu, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 156 days.

(21) Appl. No.: 17/363,833

(22) Filed: Jun. 30, 2021

(65) Prior Publication Data

US 2022/0049814 A1 Feb. 17, 2022

Related U.S. Application Data

(60) Provisional application No. 63/064,729, filed on Aug. 12, 2020.

(30) Foreign Application Priority Data

May 6, 2021 (TW) .................................. 110205118

(51) Int. Cl.
| | |
|---|---|
| *F16M 11/24* | (2006.01) |
| *F16M 11/18* | (2006.01) |
| *F16M 11/20* | (2006.01) |
| *F16M 11/04* | (2006.01) |
| *F16M 11/12* | (2006.01) |

(52) U.S. Cl.
CPC ............ *F16M 11/18* (2013.01); *F16M 11/046* (2013.01); *F16M 11/125* (2013.01); *F16M 11/2014* (2013.01); *F16M 11/24* (2013.01); *F16M 2200/024* (2013.01); *F16M 2200/08* (2013.01)

(58) Field of Classification Search
CPC .. F16M 11/18; F16M 2200/08; F16M 11/046; F16M 11/125; F16M 11/2014; F16M 11/24; F16M 2200/024
See application file for complete search history.

(56) References Cited

U.S. PATENT DOCUMENTS

| | | | | |
|---|---|---|---|---|
| 6,494,005 | B2 * | 12/2002 | Zimmerman | ........... B66F 7/025 254/420 |
| 7,044,423 | B2 * | 5/2006 | Bober | .................... F16M 11/18 248/188.4 |

(Continued)

*Primary Examiner* — Tan Le
(74) *Attorney, Agent, or Firm* — Muncy, Geissler, Olds & Lowe, P.C.

(57) ABSTRACT

A supporting device for supporting a display is provided. The supporting device includes an upright, a bearing slider, an actuating module, a driving module, and a control module. The upright includes a column body and a receiving space. The bearing slider is slidably disposed in the receiving space. The actuating module includes a screw rod and a screwing element, the screw rod is pivoted to the upright along a first axis and inserted to the screwing element, and the screwing element is disposed on the bearing slider and screws with the screw rod. The driving module is connected to the actuating module and drives the screw rod to rotate about the first axis. The control module controls the driving module to drive the screw rod to rotate to make the screwing element and the bearing slider move between a highest position and a lowest position along the first axis.

10 Claims, 6 Drawing Sheets

(56) References Cited

U.S. PATENT DOCUMENTS

| | | | |
|---|---|---|---|
| 2004/0221775 A1* | 11/2004 | Okninski | A47B 81/064 |
| | | | 108/147 |
| 2005/0045077 A1* | 3/2005 | Bober | A47B 81/06 |
| | | | 108/147 |
| 2009/0008344 A1* | 1/2009 | Jin | B60R 11/0235 |
| | | | 211/1.53 |
| 2010/0268079 A1* | 10/2010 | Woo | A61B 8/4405 |
| | | | 248/295.11 |

* cited by examiner

SUPPORTING DEVICE

CROSS REFERENCE TO RELATED APPLICATION

This application claims the benefit of U.S. Provisional Application Ser. No. 63/064,729 filed on Aug. 12, 2020, and the benefit of Taiwan Patent Application Serial No. 110205118 filed on May 6, 2021. The entirety of each Application is incorporated herein by reference.

BACKGROUND OF THE INVENTION

1. Field of the Invention

The present invention relates to a supporting device, especially a supporting device which can electrically drive a display to move up and down.

2. Description of Related Art

Generally, the display needs to be fixed on a supporting device to be stably installed on the wall or working surface for users to use. Users may have different requirements for the setting of the display, and the setting environment of the display could also be different. If the user needs to adjust the angle and the position of the display manually, the operation is relatively inconvenient. Another advanced use scenario, such as the display with the face tracking function, can be adjusted to the most suitable angle and position for the user at any time which cannot be achieved by manual adjustment. Therefore, in order to allow the user to adjust the height of the display easily, or even to actively track the user's face and adjust the height of the display at any time, a supporting device with an electric upright is needed.

SUMMARY OF THE INVENTION

An objective of the present disclosure is to provide a supporting device which is used for supporting a display. The supporting device includes an upright, a bearing slider, an actuating module, a driving module, and a control module. The upright includes a column body and a receiving space, and the column body surrounds and defines the receiving space. The bearing slider is slidably disposed in the receiving space, and partially extending outward from the receiving space to connect to the display. The actuating module includes a screw rod and a screwing element, the screw rod is pivoted to the upright along a first axis and inserted to the screwing element, and the screwing element is disposed on the bearing slider and screwing to the screw rod. The driving module is connected to the actuating module and drives the screw rod to rotate about the first axis. The control module is electrically connected to the driving module, and controls the driving module to drive the screw rod to rotate to make the screwing element and the bearing slider move between a highest position and a lowest position along the first axis and stop at any position between the highest position and the lowest position.

In one embodiment, the driving module includes a main body and an output shaft, the actuating module further includes a transfer element, the screw rod and the output shaft are connected to the transfer element respectively, the main body drives the output shaft to rotate, and make the screw rod rotate correspondingly.

In one embodiment, the transfer element includes a through hole, and the through hole includes a first connecting segment and a second connecting segment. The screw rod screws to the first connecting segment, the output shaft is connected to the second connecting segment, and the second connecting segment and the output shaft have cross sections which are both noncircular and in correspondence with each other.

In one embodiment, the screwing element includes a screw hole which is configured to screw with the screw rod.

In one embodiment, the upright further includes a connecting board, the connecting board is disposed on the column body, and the screw rod is rotatably inserted to the connecting board.

In one embodiment, the connecting board includes a top board body and a sleeve, the top board body is disposed at a top of the column body, and the sleeve penetrates through the top board body and has a sleeve hole for a top end of the screw rod is rotatably inserted therein.

In one embodiment, the screwing element further includes a board body and a cylinder which is connected to the board body. The bearing slider includes a hollow body, the board body is secured against the hollow body, the cylinder extends into the hollow body, and the screw hole is formed through the board body and the cylinder.

In one embodiment, the driving module is a direct current gear motor.

In one embodiment, the upright further includes a slide rail assembly, the slide rail assembly which is disposed in the receiving space and parallel to the first axis, and the bearing slider is disposed on the slide rail assembly.

In one embodiment, the supporting device further includes a first sensor and a second sensor which are disposed in the receiving space and electrically connected to the control module respectively. When the bearing slider slides along the first axis and triggers the first sensor, the first sensor transmits a first sensing signal to the control module. When the bearing slider slides along the first axis and triggers the second sensor, the second sensor transmits a second sensing signal to the control module. When the control module receives the first sensing signal or the second sensing signal, the control module controls the driving module to stop.

In one embodiment, the first sensor and the second sensor are photo interrupters, and the first sensor is disposed adjacent to the highest position, and the second sensor is disposed adjacent to the lowest position.

In one embodiment, the bearing slider further includes an extending piece which is disposed on the hollow body, and is configured to trigger the first sensor or the second sensor.

The supporting device of the present invention mainly uses motors, sensors and other electronic elements to adjust the height of the display on the upright. When transmitting control signals to the control circuit board installed in the supporting device, the control circuit board controls the driving module to rotate the screw rod, so that the bearing slider can move along the slide rail to adjust the height of the bearing slider.

The detailed technology and preferred embodiments implemented for the present invention are described in the following paragraphs accompanying the appended drawings for people skilled in this field to well appreciate the features of the claimed invention.

DETAILED DESCRIPTION OF THE PREFERRED EMBODIMENT

Figure 1:
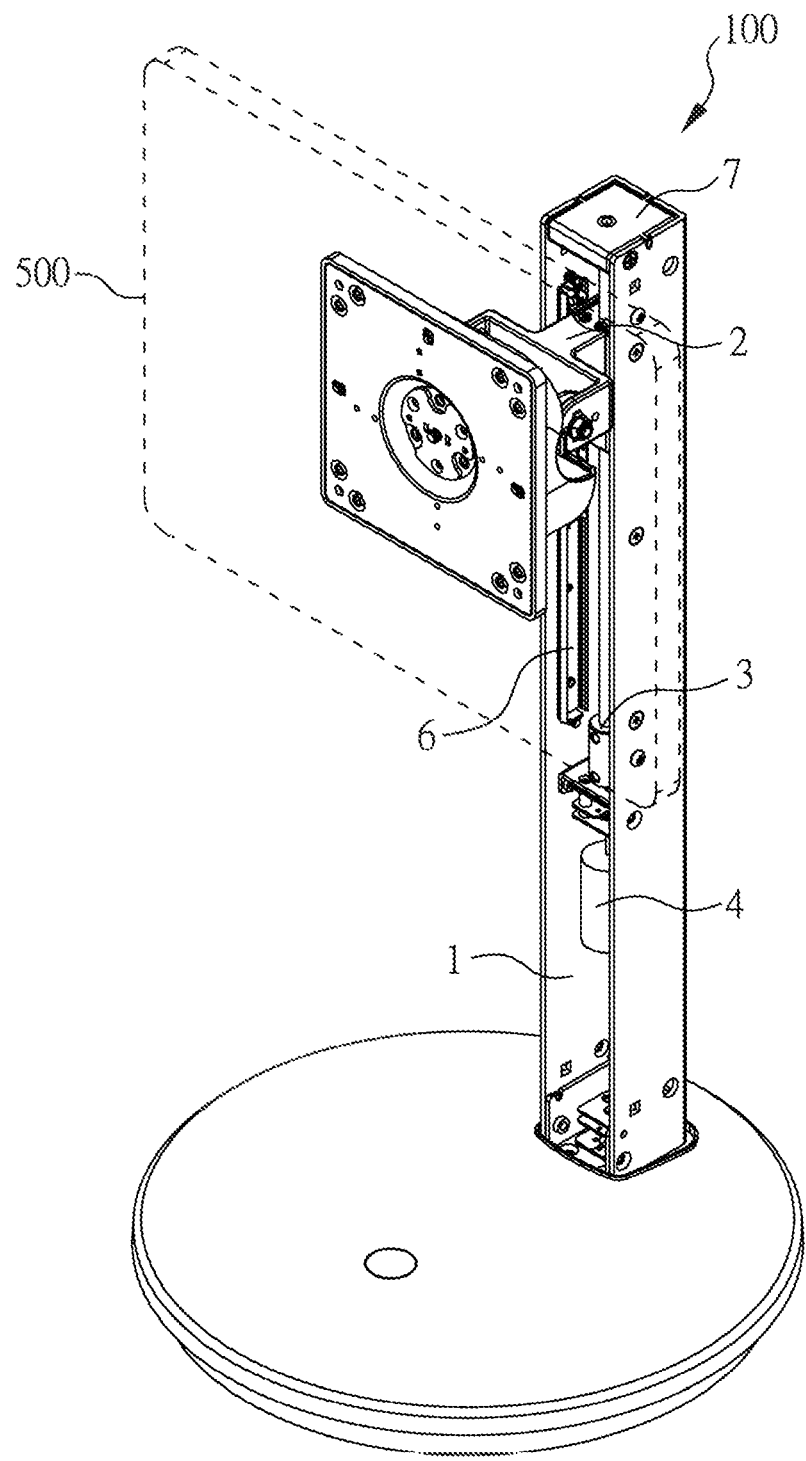
FIG. 1 is a schematic view of the supporting device with the display according to the present invention.

Reference will now be made in detail to the present embodiments of the invention, examples of which are illustrated in the accompanying drawings, and are not intended to limit the present invention, applications or particular implementations described in these embodiments. Wherever possible, the same reference numbers are used in the drawings and the description to refer to the same or like parts. It shall be appreciated that, in the following embodiments and the attached drawings, elements unrelated to the present invention are omitted from depiction; and dimensional relationships among individual elements in the attached drawings are provided only for ease of understanding, but not to limit the actual scale.

Figure 2:
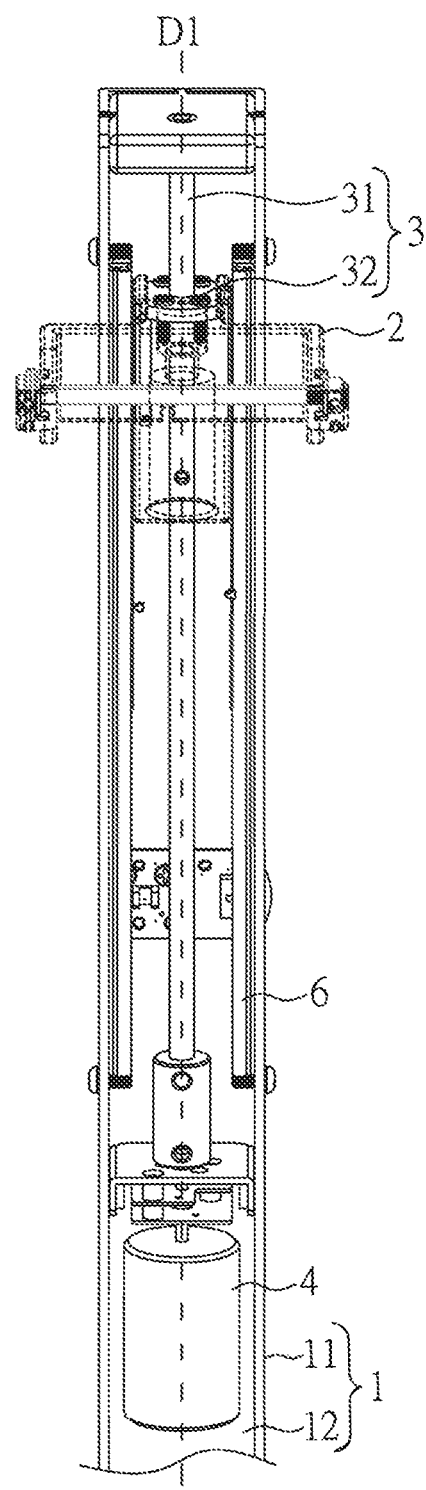
FIG. 2 is a perspective view of the upright according to the present invention.

Reference is made to FIG. 1 and FIG. 2. FIG. 1 is a schematic view of a supporting device 100 with the display 500 according to an embodiment of the present invention. FIG. 2 is a perspective view of an upright 1 according to the embodiment of the present invention. As shown in FIG. 1 and FIG. 2, the supporting device 100 is disposed on a working surface and is used for supporting the display 500. The supporting device 100 comprises the upright 1, a bearing slider 2, an actuating module 3, a driving module 4, a control module 5 (see FIG. 5), a slide rail assembly 6, and a connecting board 7. The upright 1 includes a column body 11 and a receiving space 12, wherein the column body 11 surrounds and defines the receiving space 12. The bearing slider 2 is slidably disposed in the receiving space 12, and partially extends outward from the receiving space 12 to connect to the display 500.

The actuating module 3 includes a screw rod 31 and a screwing element 32. The screw rod 31 is pivoted to the upright 1 along a first axis D1 and inserted to the screwing element 32. The screwing element 32 is disposed on the bearing slider 2 and screws to the screw rod 31. The driving module 4 is connected to the actuating module 3 and drives the screw rod 31 to rotate about the first axis D1. The driving module 4 may be implemented as a direct current gear motor. The slide rail assembly 6 is disposed in the receiving space 12 and is parallel to the first axis D1, and the bearing slider 2 is disposed on the slide rail assembly 6 so that the bearing slider 2 can slide up and down along the slide rail assembly 6. The connecting board 7 is disposed on the column body 11, and the screw rod 31 is rotatably inserted to the connecting board 7. In this embodiment, the control module 5 controls the driving module 4 to drive the screw rod 31 to rotate to make the screwing element 32 move up and down relative to the screw rod 31. Thus, the bearing slider 2 moves along with the screwing element 32 between a highest position H1 and a lowest position H2 along the first axis D1. When the driving module 4 stops driving the rotating screw rod 31, the bearing slider 2 stops at any position between the highest position H1 and the lowest position H2.

Figure 3:
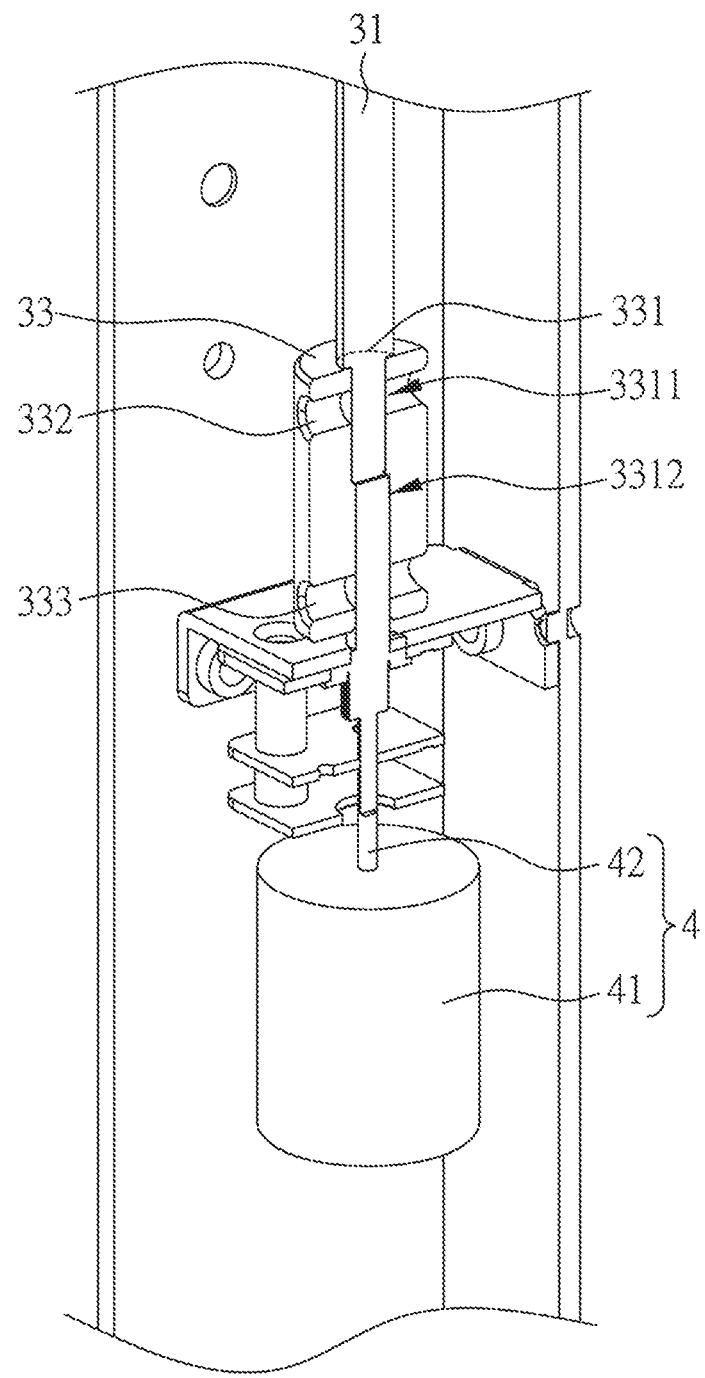
FIG. 3 is a partial cross sectional view of the upright according to the present invention.

FIG. 3 is a partial cross sectional view of the upright 1 according to the embodiment of the present invention. Referring to FIG. 3, the driving module 4 includes a main body 41 and an output shaft 42, and the actuating module 3 further includes a transfer element 33. The screw rod 31 and the output shaft 42 are connected to the transfer element 33 respectively. The main body 41 drives the output shaft 42 to rotate, and the transfer element 33 drives the screw rod 31 to rotate in response to the rotation of the output shaft 42. In detail, the transfer element 33 has a through hole 331, and the through hole 331 has a first connecting segment 3311 and a second connecting segment 3312. The screw rod 31 screws to the first connecting segment 3311, and the output shaft 42 is connected to the second connecting segment 3312.

It is noted that, both the second connecting segment 3312 and the output shaft 42 have cross sections which are in correspondence with each other and are noncircular. The screw rod 31 can directly screw to the first connecting segment 3311; alternatively, the cross section of the first connecting segment 3311 corresponds to the cross section of the end of the screw rod 31, and both of the cross sections are noncircular. The transfer element 33 further has a screw hole 332 and a screw hole 333 for installing screws (not shown in the figures) to tighten the screw rod 31 and the output shaft 42 respectively so that the output shaft 42 can drive the transfer element 33 and the screw rod 31 to rotate about the first axis D1.

Figure 4:
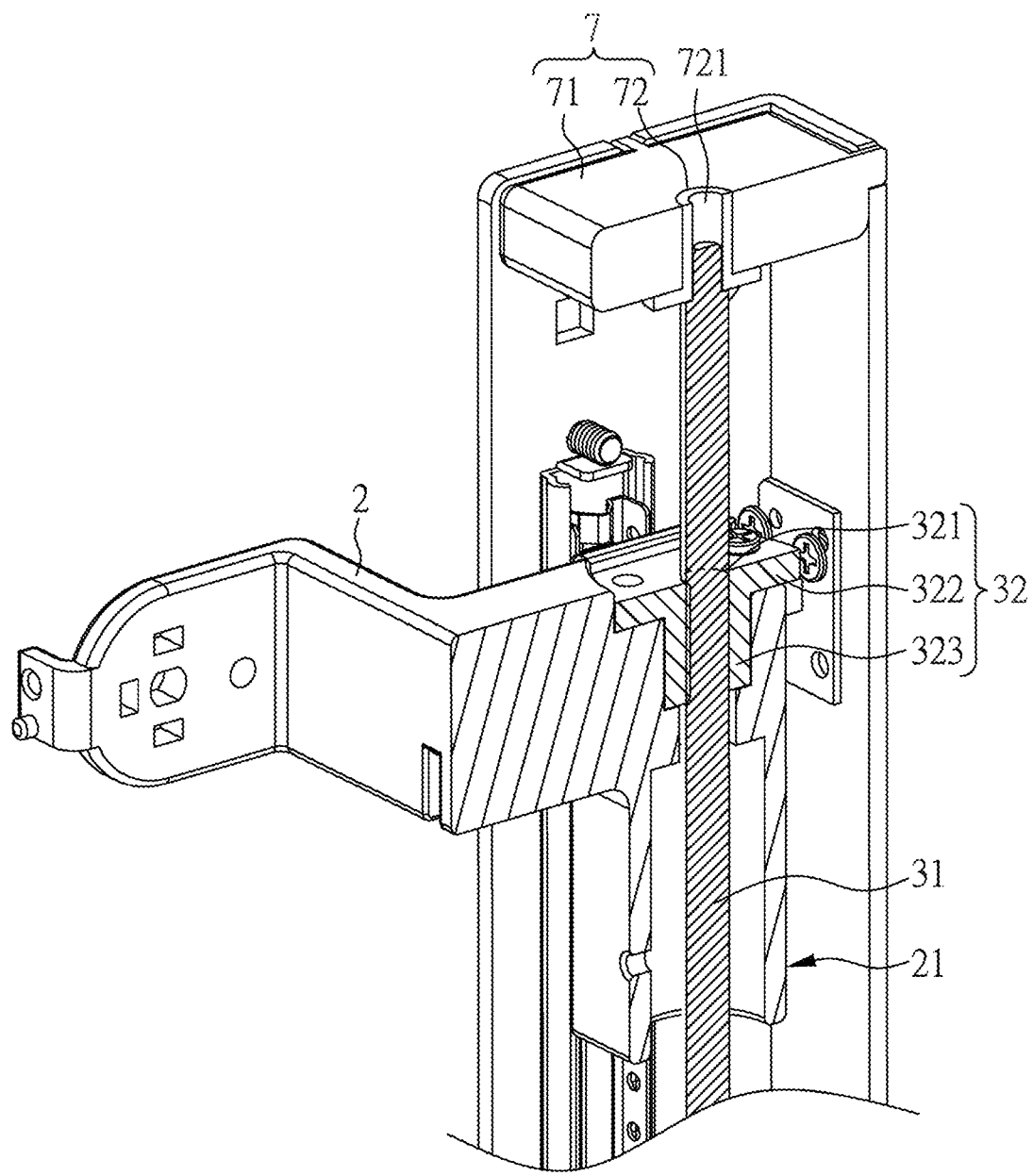
FIG. 4 is a partial cross sectional view of the upright from another view angle according to the present invention.

FIG. 4 is a partial cross sectional view of the upright 1 from another view angle according to the embodiment of the present invention. Referring to FIG. 4, the screwing element 32 has a screw hole 321, a board body 322, and a cylinder 323 which is connected to the board body 322. The screw hole 321 is formed through the board body 322 and the cylinder 323 for screwing with the screw rod 31. The bearing slider 2 includes a hollow body 21, the board body 322 is secured against the hollow body 32, and the cylinder 323 extends into the hollow body 21. The connecting board 7 includes a top board body 71 and a sleeve 72, wherein the top board body 71 is disposed on a top of the column body 11, and the sleeve 72 penetrates through the top board body 71 and has a sleeve hole 721 for a top end of the screw rod 31 rotatably inserted to the sleeve hole 721.

Figure 5:
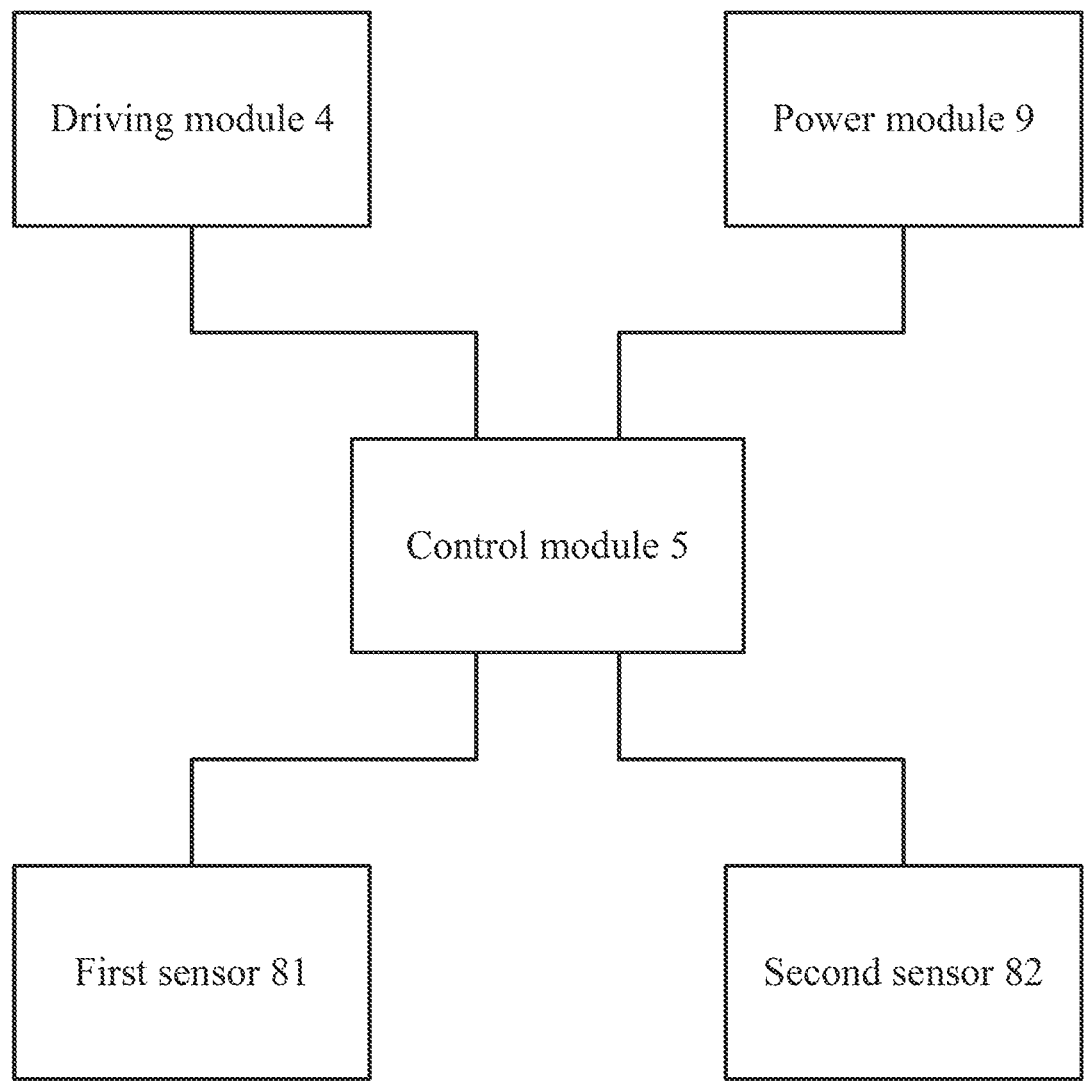
FIG. 5 is a schematic view of connections of the electrical elements of the supporting device according to the present invention.
Figure 6:
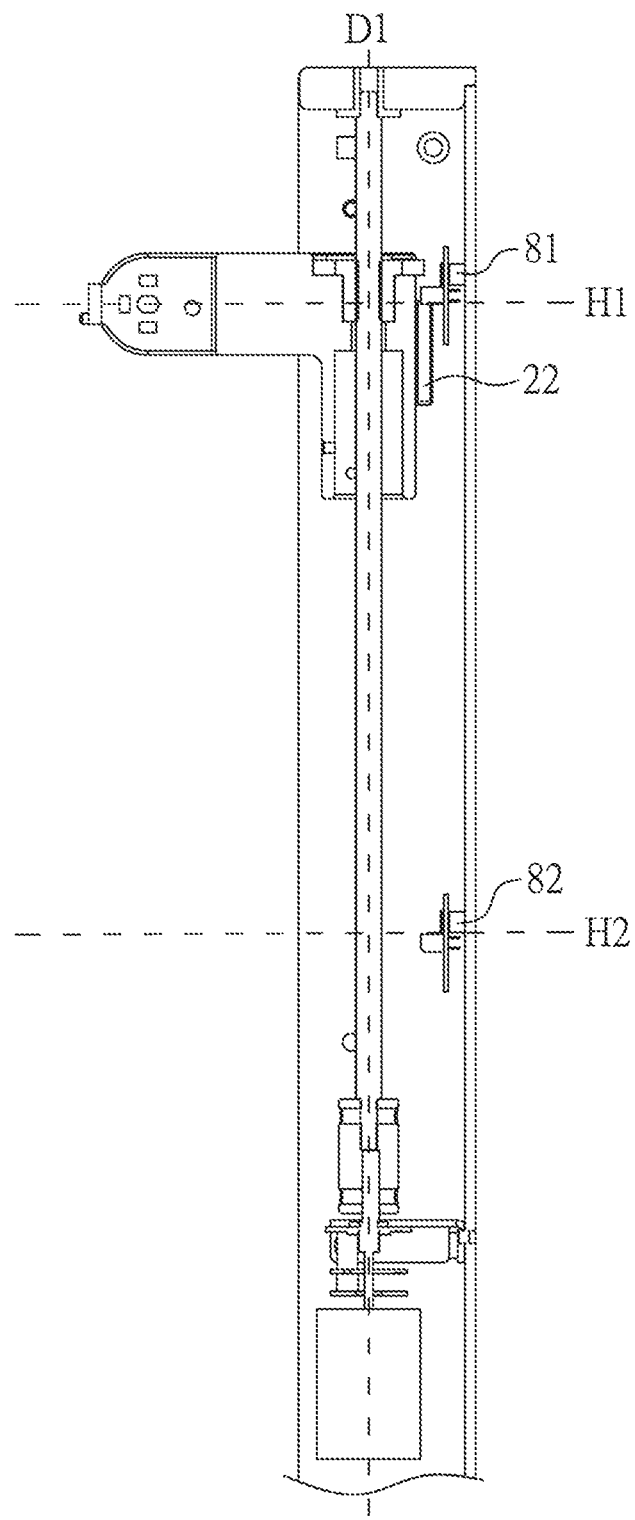
FIG. 6 is a vertical partial cross sectional view of the upright according to the present invention.

Reference is made to FIG. 5 and FIG. 6. FIG. 5 is a schematic view of connections of the electrical elements of the supporting device 100 according to the present invention, and FIG. 6 is a vertical cross sectional view of the upright 1 according to the present invention. The control module 5 is electrically connected to the driving module 4, a first sensor 81, a second sensor 82, and a power module 9. The power module 9 provides electricity to the control module 5. In this embodiment, the first sensor 81 and the second sensor 82 are disposed in the receiving space 12, wherein the first sensor 81 is disposed adjacent to the highest position H1, and the second sensor 82 is disposed adjacent to the lowest position H2. It is noted that the first sensor 81 and the second sensor 82 may be implemented as photo interrupters.

In this embodiment, the bearing slider 2 further includes an extending piece 22 which is disposed on the hollow body 21 and being configured to trigger the first sensor 81 or the second sensor 82. When the bearing slider 2 slides along the first axis D1, and the extending piece 22 triggers the first sensor 81, it means that the bearing slider 2 reaches the top position. The first sensor 81 transmits a first sensing signal to the control module 5 accordingly, and the control module 5 controls the driving module 4 to stop working in response to the first sensing signal. Thus, the output shaft 42 correspondingly stops rotating, and the screwing element 32 stops screwing relative to the screw rod 31. Similarly, when the bearing slider 2 slides along the first axis D1, and the extending piece 22 triggers the second sensor 82, it means that the bearing slider 2 reaches the bottom position. The second sensor 82 transmits a second sensing signal to the control module 5 accordingly, and the control module 5 controls the driving module 4 to stop working in response to the second sensing signal. Thus, the output shaft 42 correspondingly stops rotating, and the screwing element 32 stops screwing relative to the screw rod 31.

The number of the extending piece 22 may be one or two which correspond to the first sensor 81 and the second sensor 82 respectively. The position of the extending piece 22, the first sensor 81, and the second sensor 82 determine the distance that the bearing slider 2 moves along the first axis D1. The control module 5 will stop driving the driving module 4 once the first sensing signal or the second sensing signal is received. In addition, a substantial block may also be further disposed on the upright 1 to define a top limit position and a bottom limit position. Therefore, if the first sensor 81 and the second sensor 82 fails or the driving module 4 does not cease operation for some reason, the screwing element 32 and the bearing slider 2 can still be stopped in the limit position. The control module 5 may be implemented as a control circuit board or a controller, the control circuit board may be disposed in the receiving space 12 of the upright 1, or in a base under the upright 1 so that the user can operate the controller to transmit a control signal to the control circuit board.

According to the above descriptions, the supporting device of the present invention mainly uses motors, sensors and other electronic elements to adjust the height of the display relative to the upright. When the control signal is transmitted to the control circuit board which is installed in the supporting device, the control circuit board controls the driving module to rotate the screw rod, so that the bearing slider can move along the slide rail to adjust the height of the bearing slider.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A supporting device for supporting a display, comprising:
   an upright including a column body and a receiving space, the column body surrounding and defining the receiving space;
   a bearing slider being slidably disposed in the receiving space, and partially extending outward from the receiving space to connect to the display;
   an actuating module comprising a screw rod, a screwing element and a transfer element, the transfer element having a through hole which has a first connecting segment and a second connecting segment, the screw rod being connected to the transfer element, pivoted to the upright along a first axis, inserted to the screwing element and screwed to the first connecting segment, and the screwing element being disposed on the bearing slider and screwed to the screw rod;
   a driving module, comprising a main body and an output shaft, being connected to the actuating module and configured to drive the screw rod to rotate about the first axis, the output shaft being connected to the transfer element, the main body being configured to drive the output shaft to rotate and make the screw rod rotate correspondingly, the output shaft being connected to the second connecting segment, and the second connecting segment and the output shaft having cross sections which are both noncircular and in correspondence with each other; and
   a control module being electrically connected to the driving module;
   wherein the control module controls the driving module, and the driving module drives the screw rod to rotate to make the screwing element and the bearing slider move between a highest position and a lowest position along the first axis and stop at any position between the highest position and the lowest position.

2. The supporting device as claimed in claim 1, wherein the screwing element has a screw hole which is configured to screw with the screw rod.

3. The supporting device as claimed in claim 2, wherein the upright further includes a connecting board, the connecting board is disposed on the column body, and the screw rod is rotatably inserted to the connecting board.

4. The supporting device as claimed in claim 3, wherein the connecting board has a top board body and a sleeve, the top board body is disposed at a top of the column body, and the sleeve penetrates through the top board body and has a sleeve hole for a top end of the screw rod being rotatably inserted therein.

5. The supporting device as claimed in claim 1, wherein the screwing element further has a board body and a cylinder which is connected to the board body, the bearing slider includes a hollow body, the board body is secured against the hollow body, the cylinder extends into the hollow body, and the screw hole is formed through the board body and the cylinder.

6. The supporting device as claimed in claim 5, wherein the driving module is a direct current gear motor.

7. The supporting device as claimed in claim 5, wherein the upright further includes a slide rail assembly, which is disposed in the receiving space and parallel to the first axis, and the bearing slider is disposed on the slide rail assembly.

8. The supporting device as claimed in claim 1, further comprising a first sensor and a second sensor which are disposed in the receiving space and electrically connected to the control module respectively, wherein when the bearing slider slides along the first axis and triggers the first sensor, the first sensor transmits a first sensing signal to the control module, when the bearing slider slides along the first axis and triggers the second sensor, the second sensor transmits a second sensing signal to the control module, and when the control module receives the first sensing signal or the second sensing signal, the control module controls the driving module to stop.

9. The supporting device as claimed in claim 8, wherein the first sensor and the second sensor are photo interrupters, and the first sensor is disposed adjacent to the highest position, and the second sensor is disposed adjacent to the lowest position.

10. The supporting device as claimed in claim 8, wherein the bearing slider further includes an extending piece and a hollow body, the extending piece is disposed on the hollow body and is configured to trigger the first sensor or the second sensor.

\* \* \* \* \*